US006250578B1

(12) United States Patent
Manda

(10) Patent No.: US 6,250,578 B1
(45) Date of Patent: Jun. 26, 2001

(54) CABLE WINDING HOUSING

(75) Inventor: Venakata Krishna Roa Manda, New Albany, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/315,484

(22) Filed: May 20, 1999

(51) Int. Cl.[7] .................................................... B65H 75/48
(52) U.S. Cl. .................................... 242/378.1; 242/381.3; 242/385.4; 242/396.2; 242/396.4; 191/12.2 R
(58) Field of Search ................................ 242/378, 378.1, 242/378.4, 381, 381.1, 381.2, 381.3, 385.4, 396, 396.1, 396.2, 396.4, 396.6, 378.2; 191/12.2 R, 12 R

(56) References Cited

U.S. PATENT DOCUMENTS 745,670 * 12/1903 Riley .............................. 191/12.2 R
902,647 * 11/1908 Day .............................. 242/396.1 X
915,288 * 3/1909 Hagstrom ...................... 242/385.4 X
1,276,825 * 8/1918 Swope .............................. 242/378.2
2,393,417 * 1/1946 Ruttkay ......................... 242/385.4 X
3,693,596 * 9/1972 Croce et al. .................. 242/385.4 X
4,195,795 * 4/1980 Ardizio ............................ 242/378.4
4,245,798 * 1/1981 Steger ........................... 242/385.4 X
4,840,324 * 6/1989 Higbee et al. .................... 242/385.4
5,002,003 * 3/1991 Blue ............................. 242/381.3 X
5,174,625 * 12/1992 Gothier et al. .................... 242/396.4
5,294,029 * 3/1994 Shimura et al. .............. 242/385.4 X
5,489,010 * 2/1996 Rogers .......................... 242/396.6 X
5,669,571 * 9/1997 Graybill ............................ 242/378.1

FOREIGN PATENT DOCUMENTS

4272069 * 9/1992 (JP) .................................. 242/385.4

* cited by examiner

*Primary Examiner*—William A. Rivera
(74) *Attorney, Agent, or Firm*—Jean-Marc Zimmerman

(57) ABSTRACT

A cable winding housing for a cable used to interconnect a computer and an external peripheral device. The housing includes a spring-operated, winding cylindrical shaft around which the cable is wound, a teeth wheel assembly superposed around the shaft, and a spring-loaded locking element configured for locking between two of the teeth on the teeth wheel, wherein the locking element is releasable from outside of the housing. When the locking element is locked into the teeth wheel, the shaft is prevented from rotating such that the cable can not be unwound from or wound into the housing. When the locking element is released from the teeth wheel, the shaft can rotate and the cable can alternatively be either wound into or unwound from the housing. The housing prevents a cable used to interconnect two devices from becoming entangled with other cables and ensures that each cable is taut and does not sag downward, thereby providing a neat connection.

23 Claims, 5 Drawing Sheets

62 66 60 78 76 72 20 18 24 64 82 80 84 86 72 70 D 32 30 34 28 18 22 26

20
18
24
18
92
94
26
18
22
20'
18'
24'
28'
26'
18'
22'
36
46
40
48
42
50
38
44
32
30
28
34
36'
46'
40'
48'
42'
50'
38'
44'
32'
30'

CABLE WINDING HOUSING

FIELD OF THE INVENTION

The present invention relates to the field of cable winding housing, and more particularly to a cable winding housing for a cable used to interconnect a computer and an external peripheral device.

BACKGROUND OF THE INVENTION

Computers and associated external peripheral devices such as monitors, printers, scanners, etc., are widely used today in business, education, government and at home. Typically, a plurality of cables are used to interconnect such devices. Such cables often become entangled, sometimes hanging downwards in a disorganized and untidy manner from the coupling ports to which they are coupled. This often makes it difficult to identify a particular cable interconnected between two ports, as well as difficult to ascertain whether a connection has been properly made. FIG. 1 shows a desk-top computer A and a computer monitor B conventionally interconnected using cables, wherein the cables are entangled and hang downwards.

SUMMARY OF THE INVENTION

A cable winding housing for a cable used to interconnect a computer and an external peripheral device, wherein the cable winding housing includes a spring-biased, cylindrical shaft around which the cable is wound, a teeth wheel assembly superposed around the shaft, and a releasable, spring-biased locking element configured for locking between teeth of the teeth wheel to prevent the shaft from rotating. When the locking element is released, the shaft can rotate so that the cable can be either unwound from or wound into the housing. The present invention prevents cables used to interconnect two devices from becoming entangled and ensures that each such cable is taut and does not sag downwards.

DETAILED DESCRIPTION OF THE INVENTION

Figure 1:
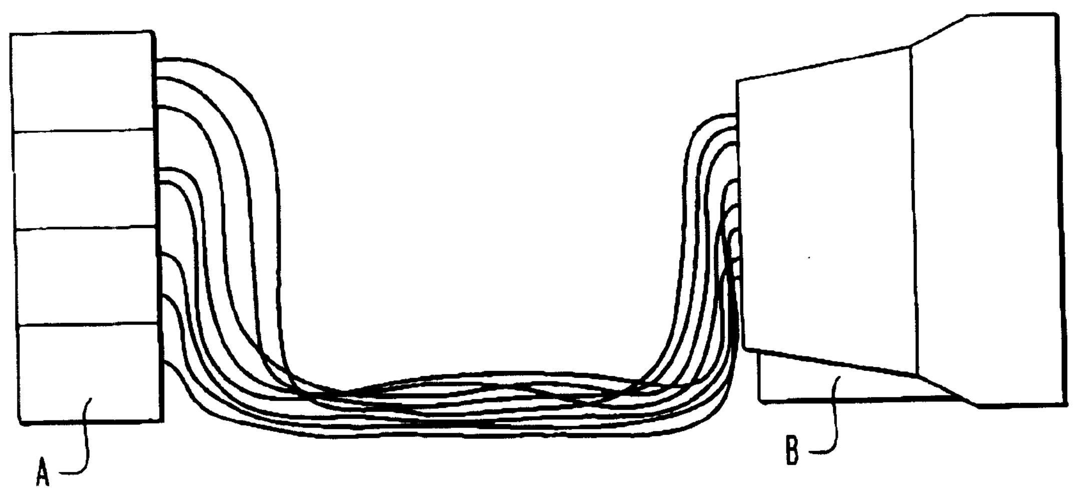
FIG. 1 shows a desk-top computer and a computer monitor conventionally interconnected by a plurality of cables, wherein the cables hang downwards.
Figure 2:
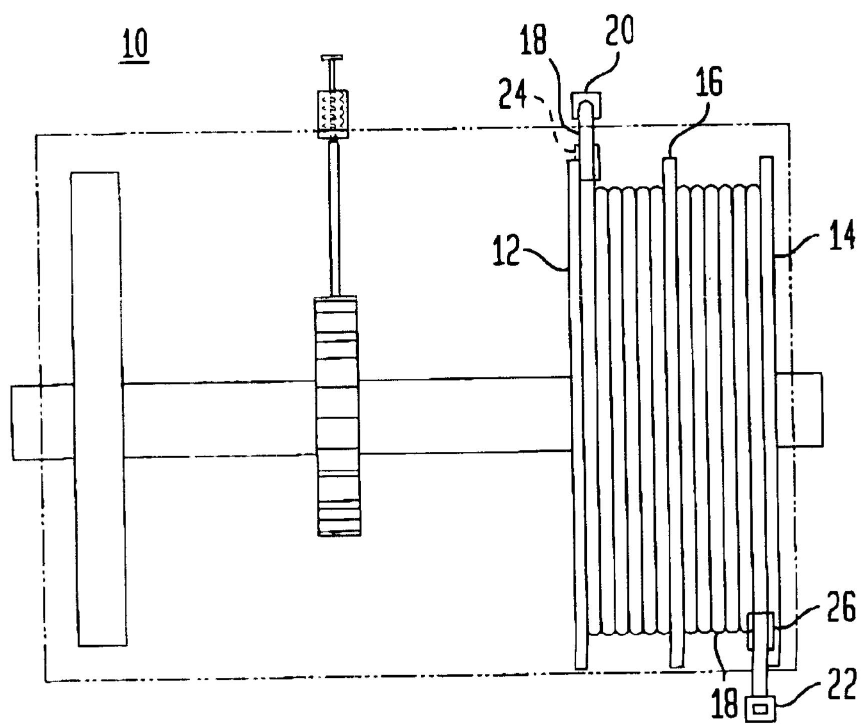
FIG. 2 shows a front end view of an exemplary embodiment of a cable winding housing according the present invention.

FIG. 2 shows a front end view of an exemplary embodiment of a cable winding housing 10 according to the present invention. Housing 10 prevents a cable used to interconnect a computer and an external peripheral device, such as a computer monitor, from becoming entangled and ensures that the cable is taut and does not sag downward, thereby providing a neat connection. Housing 10 is comprised of first enclosure half 12 and second enclosure half 14 which are secured together by latch 16. Alternatively, enclosure halves 12 and 14 can be secured to one another by any other any conventional closing means, or they can be fabricated to fit together to form a secure closure.

Housing 10 houses a cable 18 used to interconnect a computer and an external peripheral device, wherein cable 18 has a first end 20 and a second end 22. Housing 10 includes first opening 24 and second opening 26 through which first cable end 20 and second cable end 22, respectively, can be wound and unwound. First and second housing openings 24 and 26 can both be formed in the same enclosure half, or can each be formed in separate enclosure halves 12 and 14.

Figure 3:
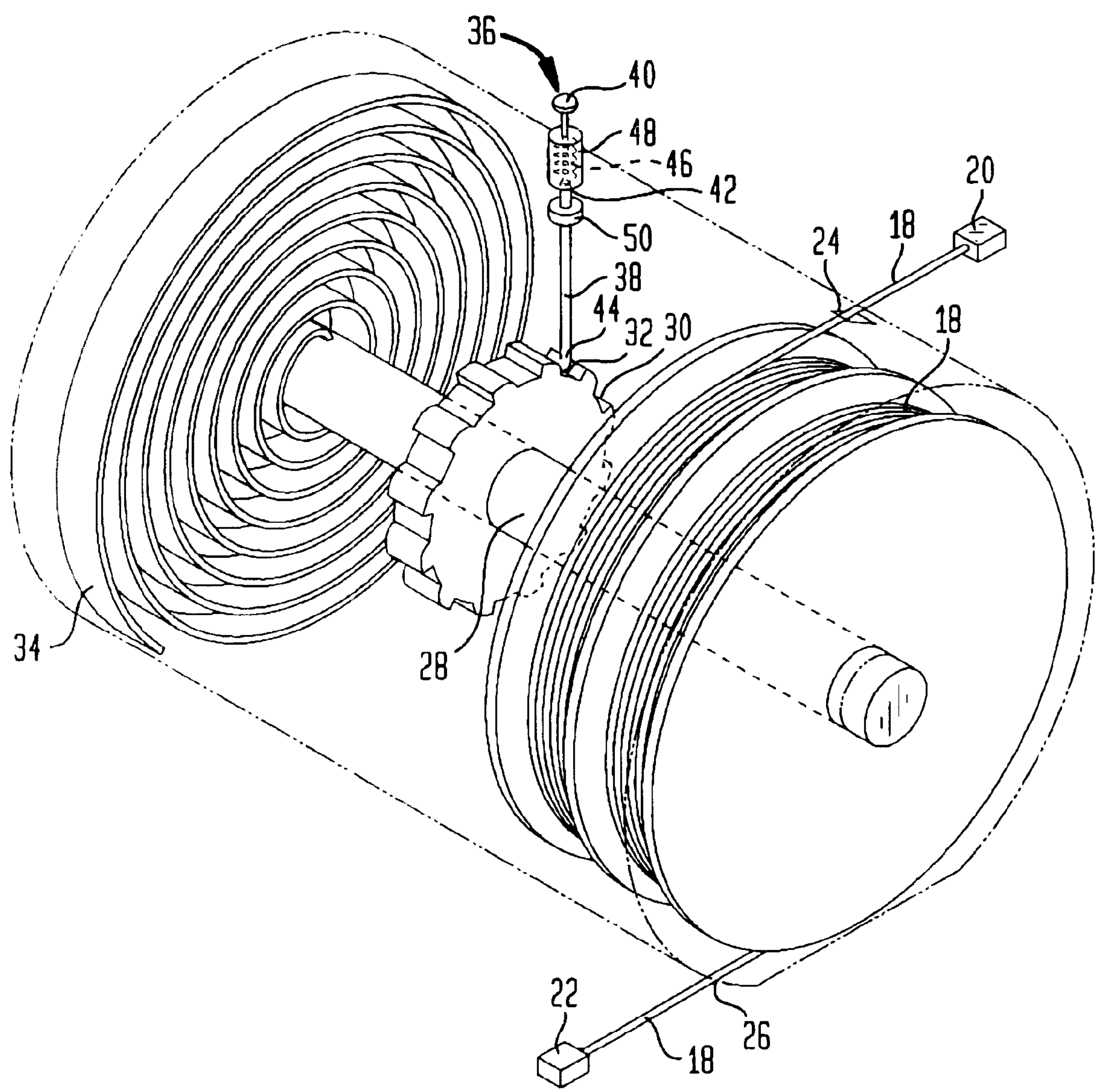
FIG. 3 shows a cut-away side view of the cable winding housing shown in FIG. 2 in which its internal components are separated from one another for easy viewing.

FIG. 3 shows a cut away side view of housing 10 in which its internal components are separated from one another for easy viewing. Housing 10 includes a cylindrical, rotatable shaft 28 around which is superposed a teeth wheel 30 having a plurality of teeth 32. Shaft 28 can be coupled to the interior of either enclosure half 12 or 14.

A coiled spring 34 is superposed around shaft 28 and teeth wheel 30. Spring 34 exerts a constant pressure on shaft 28 which causes shaft 28 to rotate around its longitudinal axis C. Housing 10 also includes a releasable, spring-loaded locking pin assembly 36 comprising a locking pin 38 having a knob-like first end 40 protruding externally through an opening 42 in housing 10, a second end 44 configured for insertion and withdrawal from between two of the plurality of teeth 32 on teeth wheel 30, and a spring 46 housed in a spring housing 48 interposed between locking pin first end 40 and housing 10.

Spring 46 exerts a constant pressure on locking pin assembly 36 which pulls locking pin first end 40 towards housing 10 and locks locking pin second end 44 into teeth wheel 30 until locking pin 38 is released by a user. A band 50 which is larger in size than opening 42 is affixed around a segment of locking pin 38 inside housing 10 to prevent locking pin 38 from either being completely withdrawn through or falling out of opening 42.

When locking pin first end 40 is pulled away from housing 10, locking pin 38 is released such that locking pin second end 44 is withdrawn from between two of the plurality of teeth 32, thereby enabling shaft 28 to rotate and cable 18 to be either unwound from or wound into housing 10. By contrast, when locking pin 38 is engaged, locking pin second end 44 rests between two of the plurality of teeth 32 and shaft 28 is prevented from rotating such that any portions of cable 18 which are unwound outside of housing 10 will remain so and will not be wound into housing 10.

Housing 10 is used as follows. Cable 18 is wound around and secured to shaft 28. First and second cable ends 20 and 22 are then thread out of housing 10 through openings 24 and 26, respectively, for coupling two devices together. Cable 18 can be any type of cable used in conventional communications systems. Enclosure halves 12 and 14 are then secured to one another to form closed housing 10.

When locking pin 38 is released, first and second cable ends 20 and 22 can be unwound from housing 10 until a sufficient length of cable 18 is unwound to interconnect two devices. Pulling either one of cable ends 20 or 22 away from housing 10 will cause both cable ends 20 and 22 to simultaneously unwind from housing 10. If, when locking pin 38 is released, cable ends 20 and 22 are not held by a user, cable 18 will be wound into housing 10, taking up the slack in any portions of cable 18 which are unwound outside of housing 10, and thereby providing a taut cable connection between two interconnected devices.

Housing 10 can also house cables used to interconnect other types of devices such as a television and a video cassette recorder. In addition, housing 10 can house a telephone cord used to couple a device such as a modem or telephone answering machine to a telephone/data jack.

Cable winding housing 10, shaft 28, teeth wheel 30, plurality of teeth 32, springs 34 and 46, locking pin 38, spring housing 48 and band 50 can each be fabricated from any material including metal, plastic and/or wood. In addition, housing 10, shaft 28, teeth wheel 30, plurality of teeth 32, springs 34 and 46, locking pin 38, spring housing 48 and band 50 can each be fabricated in any shape.

Figure 4:
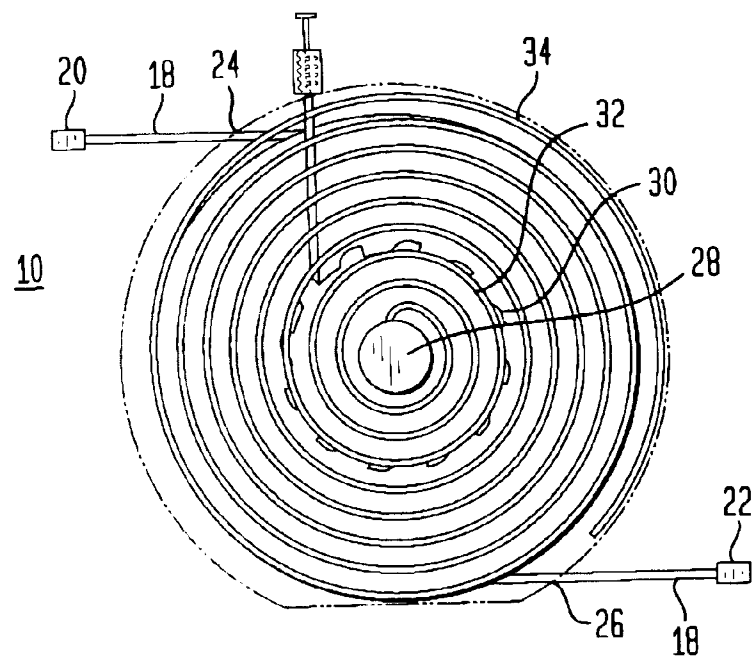
FIG. 4 shows a cut-away side view of the cable winding housing shown in FIG. 2 in which its internal components are assembled.
Figure 5:
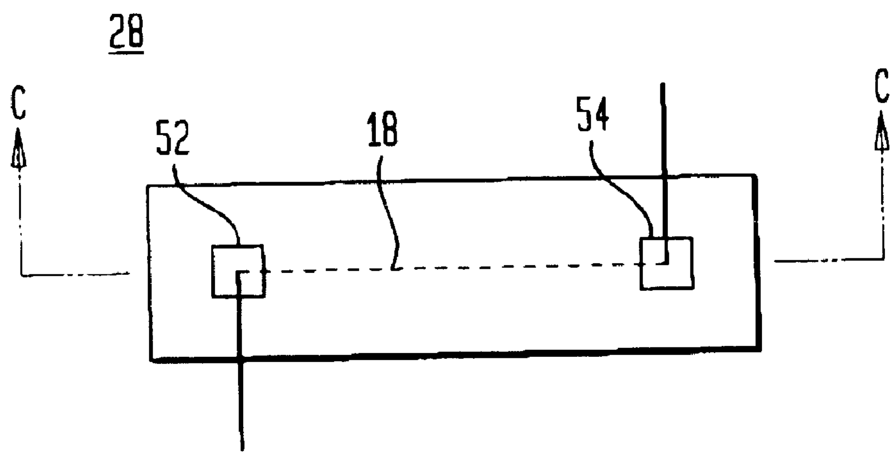
FIG. 5 shows how a cable is wound around and through the rotatable cylindrical shaft portion of the housing shown in FIG. 2.
Figure 6:
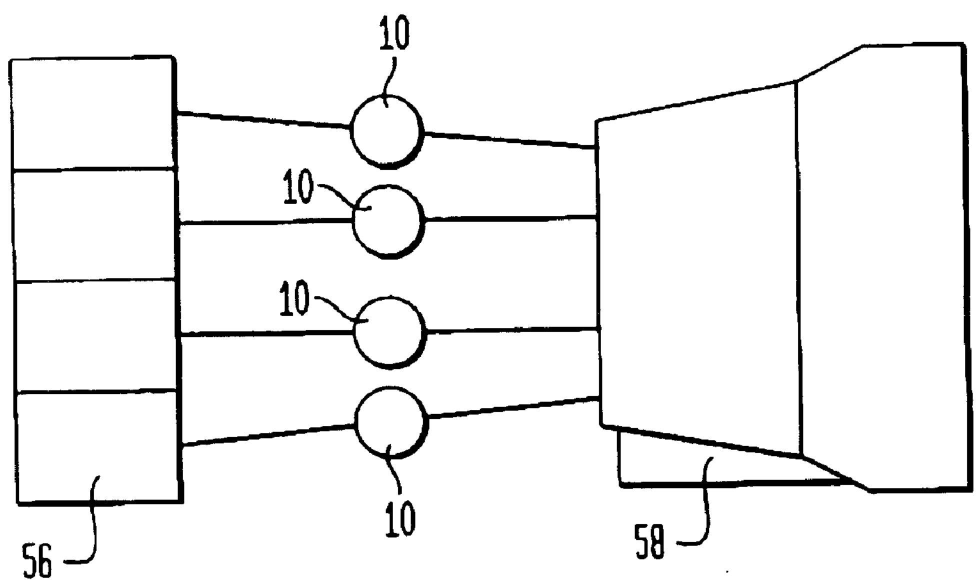
FIG. 6 shows a desk-top computer and a computer monitor interconnected by a plurality of cables each housed in the cable winding housing shown in FIG. 2.

FIG. 4 shows a cut away side view of housing 10 in which its internal components are assembled. FIG. 5 shows shaft 28 which includes at least two openings 52 and 54 through which cable 18 is thread in order to be secured to shaft 28. FIG. 6 shows a computer 56 and a computer monitor 58 interconnected by a plurality of cables each housed in housing 10.

Figure 7:
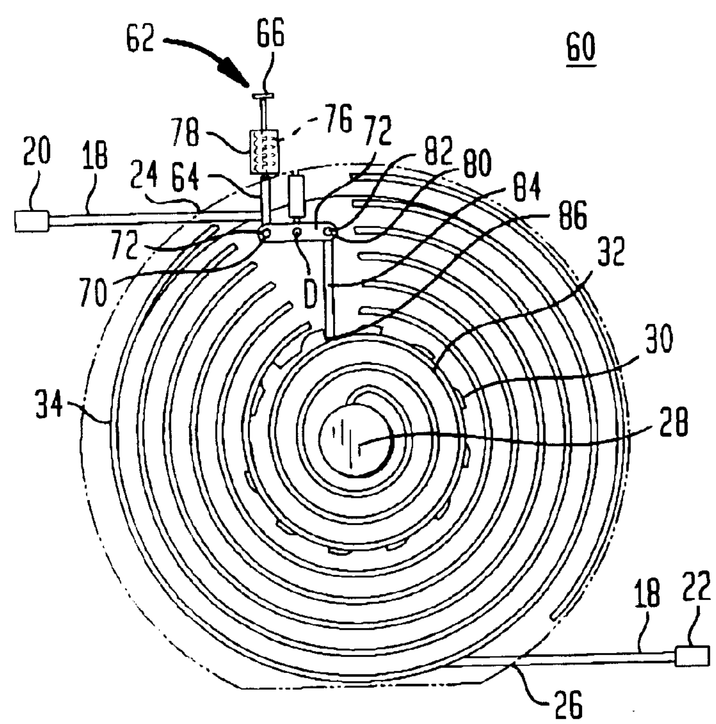
FIG. 7 shows a cut-away side view of a first alternative embodiment of a cable winding housing according to the present invention in which its internal components are separated from one another for easy viewing.

FIG. 7 shows a cut-away side view of an alternative embodiment of a cable winding housing 60 according to the present invention in which its internal components are separated from one another for easy viewing. In FIG. 7, components having the same function as those shown in FIGS. 1–6 are designated by the same number. In FIG. 7, a releasable, push-pull, spring-loaded locking pin assembly 62 is substituted for releasable, spring-loaded locking pin assembly 36 shown in FIGS. 1–6.

Locking pin assembly 62 is comprised of a pushing pin 64 having a knob-like first end 66 protruding externally through an opening 68 in housing 60, a second end 70 coupled to a first end 72 of a pivotally moveable bar 74, and a spring 76 housed in a spring housing 78 interposed between pushing pin first end 66 and housing 60. Pivotally moveable bar 74 has a second end 80 coupled to a first end 82 of a locking pin 84. Locking pin 84 has a second end 86 configured for insertion and withdrawal from between two of the plurality of teeth 32 on teeth wheel 30.

Pivotally moveable bar 74 is pivotally coupled at a pivot point D located between pivotally moveable bar first and second ends 72 and 80, respectively, to a stationary branch 88 protruding towards the center of the interior of housing 20 from the exterior surface of housing 60. As described in greater detail below, pivotally moveable bar first and second ends 72 and 80 move about pivot point D in opposite directions with respect to one another. Spring 76 exerts a constant pressure on locking pin assembly 62 which forces pushing pin first end 66 away from housing 60 and locks locking pin second end 86 into teeth wheel 30 until locking pin assembly 62 is released.

Cable 18 is both unwound from and wound into housing 60 by pushing instead of pulling on the locking pin assembly. When a user releases locking pin assembly 62 by pushing on pushing pin first end 66, both pushing pin second end 74 and pivotally moveable bar first end 76 are displaced towards the center of the interior of housing 60, which in turn causes both pivotally moveable bar second end 80 and locking pin first end 82 to be displaced towards the exterior surface of housing 60. As a result, locking pin second end 86 is withdrawn from between at least two of the plurality of teeth 32 on teeth wheel 30, thereby enabling hub 28 to rotate such that cable 18 can be either unwound from or wound into housing 60.

When locking pin assembly 62 is released, first and second cable ends 20 and 22 can be unwound from housing 60 until a sufficient length of cable 18 is unwound to interconnect two devices. Pulling either one of cable ends 20 or 22 away from housing 60 will cause both cable ends 20 and 22 to simultaneously unwind from housing 60. If, when locking pin assembly 62 is released, cable ends 20 and 22 are not held by a user, cable 18 will be wound into housing 60 taking up the slack in any portions of cable 18 which are unwound outside of housing 60, and thereby providing a taut cable connection between two interconnected devices.

Figure 8:
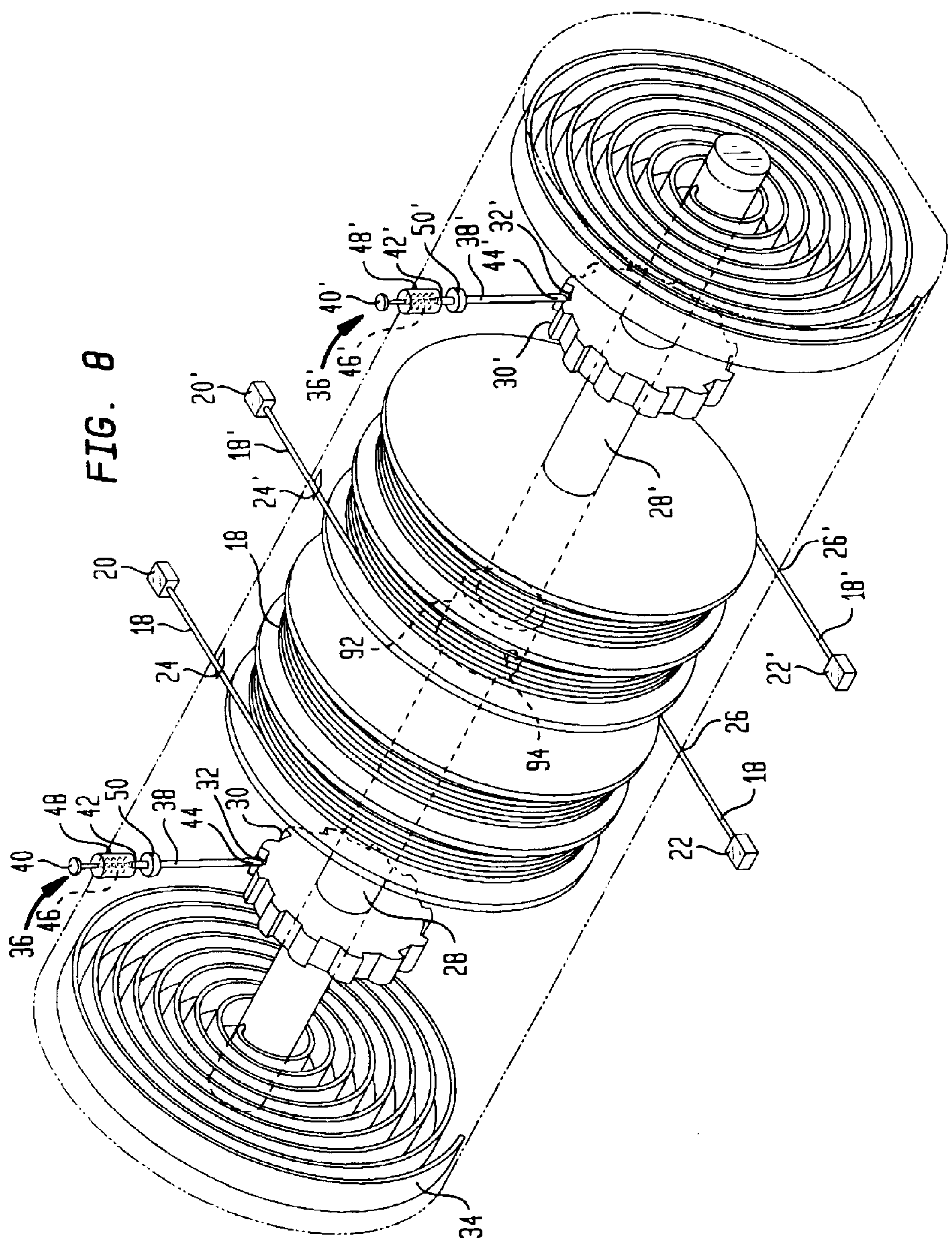
FIG. 8 shows a cut-away side view of a second alternative embodiment of a cable winding housing according to the present invention in which its internal components are separated from one another for easy viewing.

FIG. 8 shows a cut-away side view of a second alternative embodiment of a cable winding housing 90 according to the present invention in which its internal components are separated from one another for easy viewing. Housing 90 includes two of each one of the components included in housing 10 described above and shown in FIGS. 1–6. Components having the same function as those shown in FIGS. 1–6 are designated by the same number, with the second one of each such component being further designated by a prime symbol. For example, housing 90 includes locking pin assemblies 36 and 36'.

Housing 90 also includes a stationary element 92 positioned between shafts 28 and 28' which separates the two shafts from one another and enables each shaft to rotate independently of one another. Stationary element 92 includes a coupling member 94 to which the midpoint of the length of cable 18 is secured. Each half of cable 18 is then wound around a separate one of shafts 28 and 28' with the portion of cable 18 ending in cable end 20 being wound around shaft 28 and the portion of cable 18 ending in cable end 22 being wound around shaft 28'.

Housing 90 is used in the same manner as housing 10 except that since cable 18 is wound around two shafts 28 and 28' which rotate independent of one another, cable ends 20 and 22 can each be unwound from and wound into housing 90 independently of one another, such that unwinding either end 20 or 22 from housing 90 will not result in the other end also being unwound, and winding either end 20 or 22 into housing 90 will not result in the other end also being wound therein.

In another alternative embodiment of the present invention not shown, the housing includes two of each one of the components of housing 60 described above and shown in FIG. 7, including two push-pull locking pin assembly 62.

The foregoing merely illustrates the principles of the invention. It will thus be appreciated that those skilled in the art will be able to devise various arrangements which, although not explicitly described or shown herein, embody the principles of the invention and are included within its spirit and scope.

What is claimed is:

1. A cable winding housing, comprising:

an enclosure having a rotatable cylindrical shaft positioned therein, the shaft being configured for receiving a cable used to interconnect two electronic devices;

a teeth wheel coupled to the shaft;

a coiled spring superposed around the shaft and the teeth wheel;

a releasable, spring biased locking element configured for locking into the teeth wheel, wherein when the locking element is locked into the teeth wheel the shaft is prevented from rotating thereby preventing the cable from both being wound into and unwound from the housing, and when the locking element is released from the teeth wheel the shaft can rotate thereby enabling the cable to alternatively be unwound from the housing to interconnect two electronic devices, and wound into the housing to provide a taut cable connection between the two electronic devices; and the releasable spring biased locking element being comprised of:

a pushing pin having a first end protruding externally from the housing and a second end;

a pivotally moveable bar having a first end and a second end, the pivotally moveable bar being pivotally coupled to a stationary element in the interior of the housing, the pushing pin second end being coupled to the pivotally moveable bar first end; and a locking pin having a first end and a second end, the locking pin first end being coupled to the pivotally moveable bar second end and the locking pin second end being configured for insertion and withdrawal from between the at least two of the plurality of teeth, wherein when the pushing pin first end is pushed towards the housing, both the pushing pin second end and the pivotally moveable bar first end are displaced towards the center of the interior of the housing causing both pivotally moveable bar second end and locking pin first end to be displaced towards the exterior of the housing, thereby withdrawing locking pin second end from between at least two of the plurality of teeth and enabling the shaft to rotate.

2. The housing according to claim 1, wherein the enclosure is comprised of two enclosure halves coupled together.

3. The housing according to claim 2, wherein the two enclosure halves are secured closed by a latch.

4. The housing according to claim 1, wherein the teeth wheel has a plurality of teeth and the locking element has a first end protruding externally from the enclosure and a second end configured for insertion and withdrawal from between at least two of the plurality of teeth.

5. The housing according to claim 4, wherein the locking element is released by pushing the locking element first end towards the housing.

6. The housing according to claim 5, wherein when the locking element first end is pushed towards the housing, the locking element second end is withdrawn from between the at least two of the plurality of teeth of the teeth wheel, thereby enabling the shaft to rotate.

7. The housing according to claim 4, wherein when the locking element is locked the locking element second end rests between the at least two of the plurality of teeth of the teeth wheel, thereby preventing the shaft from rotating.

8. The housing according to claim 1, wherein when the locking element first end is pulled away from the housing, the locking element second end is withdrawn from between the at least two of the plurality of teeth of the teeth wheel, thereby enabling the shaft to rotate.

9. The housing according to claim 8, wherein the locking element first end protrudes externally through an opening in the housing, and a band larger than the opening is coupled to a portion of the locking element inside of the housing to prevent the locking element from being either completely withdrawn from or falling out of the housing.

10. The housing according to claim 1, wherein the cable has a first end and a second end and the housing has a first opening and a second opening, wherein the first cable end is wound into and unwound from the housing through the first housing opening, and the second cable end is wound into and unwound from the housing through the second housing opening.

11. The housing according to claim 10, wherein both the first cable end and the second cable end are simultaneously unwound from the housing by pulling on either one of the first cable end and the second cable end.

12. The housing according to claim 1, wherein the cable is secured to the shaft.

13. The housing according to claim 12, wherein the shaft includes at least two openings through which the cable is thread.

14. The housing according to claim 1, wherein when the locking element is locked, those portions of the cable that are then unwound outside of the housing remain outside of the housing.

15. The housing according to claim 1, wherein the shaft has a longitudinal axis, and the spring exerts a pressure on the shaft which causes the shaft to rotate around the longitudinal axis.

16. The housing according to claim 15, wherein the pressure is constant.

17. The housing according to claim 1, wherein the housing houses a cable used to interconnect a computer and an external peripheral device.

18. The housing according to claim 1, further comprising:

a second rotatable cylindrical shaft positioned therein, the second shaft being configured for receiving a second portion of the cable and the first shaft being configured for receiving a first portion of the cable;

a stationary element positioned between the first shaft and the second shaft, wherein the stationary element enables the first shaft to rotate independently of the second shaft;

a second teeth wheel coupled to the second shaft;

a second coiled spring superposed around the second shaft and the second teeth wheel; and a second releasable, spring biased locking element configured for locking into the second teeth wheel, wherein when the second locking element is locked into the second teeth wheel the second shaft is prevented from rotating thereby preventing the second portion of the cable wound around the second shaft from both being wound into and unwound from the housing, and when the second locking element is released from the second teeth wheel the second shaft can rotate thereby enabling the second portion of the cable wound around the second shaft to alternatively be unwound from the housing and wound into the housing to provide a taut cable connection between one of the two electronic devices and the housing.

19. The housing according to claim 18, wherein the first portion of the cable can be unwound from and wound into the housing independently of the second portion of the cable.

20. A cable winding housing, comprising;

a housing for a cable used to interconnect a computer and an external peripheral device;

a spring-biased, cylindrical shaft positioned in the housing, the shaft being configured for receiving the cable;

a teeth wheel having a plurality of teeth superposed around the shaft;

a spring-biased locking element releasable from outside of the housing, wherein when the locking element is locked into the teeth wheel the shaft is prevented from rotating and the cable can not be wound into the housing, and when the locking element is released from the teeth wheel the shaft can rotate and wind the cable into the housing to provide a taut cable connection between the computer and the external peripheral device; and the releasable, spring-biased locking element being comprised of:

a pushing pin having a first end protruding externally from the housing and a second end;

a pivotally moveable bar having a first end and a second end, the pivotally moveable bar being pivotally coupled to a stationary element in the interior of the housing, the knob pin second end being coupled to the pivotally moveable bar first end; and a locking pin having a first end and a second end, the locking pin first end being coupled to the pivotally moveable bar second end and the locking pin second end being configured for insertion and withdrawal from between the at least two of the plurality of teeth, wherein when the pushing pin first end is pushed towards the housing, both the pushing pin second end and the pivotally moveable bar first end are displaced towards the center of the interior of the housing causing both pivotally moveable bar second end and locking pin first end to be displaced towards the exterior of the housing, thereby withdrawing locking pin second end from between at least two of the plurality of teeth and enabling the shaft to rotate.

21. The housing according to claim 20, wherein the teeth wheel has a plurality of teeth and the releasable, spring-biased locking element has a first end protruding externally from the housing and a second end configured for insertion and withdrawal from between at least two of the plurality of teeth.

22. The housing according to claim 21, wherein the releasable, spring-biased locking element is released by pulling the locking element first end away from the housing, thereby causing the locking element second end to be withdrawn from the at least two of the plurality of teeth and enabling the shaft rotate and wind the cable into the housing, the locking element first end protruding externally through the an opening in the housing, and a band larger than the opening being coupled to a portion of the locking element inside of the housing to prevent the locking element from being either completely withdrawn from or falling out of the housing.

23. The housing according to claim 21, wherein the releasable, spring-biased locking element is released by pushing the locking element first end towards the housing, thereby causing the locking element second end to be withdrawn from the at least two of the plurality of teeth and enabling the shaft to rotate and wind the cable into the housing.

* * * * *